US007532988B2

(12) United States Patent
Khibnik et al.

(10) Patent No.: US 7,532,988 B2
(45) Date of Patent: May 12, 2009

(54) VIRTUAL LOAD MONITORING SYSTEM AND METHOD

(75) Inventors: Alexander I. Khibnik, Glastonbury, CT (US); Mauro Jorge Atalla, South Glastonbury, CT (US); Alan M. Finn, Hebron, CT (US); Mark W. Davis, Southbury, CT (US); Jun Ma, Hamden, CT (US); James Cycon, Media, PA (US); Peter F. Horbury, Stratford, CT (US); Andreas Bernhard, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/567,198

(22) PCT Filed: Aug. 9, 2004

(86) PCT No.: PCT/US2004/025733

§ 371 (c)(1),
(2), (4) Date: Dec. 11, 2006

(87) PCT Pub. No.: WO2005/015332

PCT Pub. Date: Feb. 17, 2005

(65) Prior Publication Data

US 2007/0168157 A1 Jul. 19, 2007

Related U.S. Application Data

(60) Provisional application No. 60/493,198, filed on Aug. 7, 2003.

(51) Int. Cl.
*G01R 13/00* (2006.01)
(52) U.S. Cl. ....................................... 702/66

(58) Field of Classification Search .................. 702/56, 702/57, 59, 66, 67, 70, 71, 75, 77, 80, 90, 702/104, 116, 120, 124, 182, 183, 185, 189, 702/193; 73/587
See application file for complete search history.

(56) References Cited

U.S. PATENT DOCUMENTS 4,956,999 A * 9/1990 Bohannan et al. ............. 73/587

(Continued)

FOREIGN PATENT DOCUMENTS

EP 1 298 511 4/2003

OTHER PUBLICATIONS

International Search Report for PCT Application No. PCT/US2004/025733, Feb. 3, 2005.

*Primary Examiner*—Edward Raymond
*Assistant Examiner*—Mohamed Charioui
(74) *Attorney, Agent, or Firm*—Carlson, Gaskey & Olds (57) ABSTRACT

A method and system estimates a desired output signal waveform based on measured state parameters. A model training step generates a model by empirically obtaining measured signal waveforms corresponding to measured state parameters. Features, such as mode shapes and mode amplitudes, are extracted from the measured signals and stored in an estimation model along with coefficients of the model that correlate measured state parameters with the mode amplitudes. During part operation, the state parameters measured during operation are entered into the estimation model to obtain estimated features in a estimated signal waveform. The estimated features are then used to synthesize the estimated signal reflecting the actual operation of the operating part. The estimation model therefore allows estimation of an entire signal waveform from the state parameters.

30 Claims, 3 Drawing Sheets

U.S. PATENT DOCUMENTS

| | | |
|---|---|---|
| 5,548,528 A | 8/1996 | Keeler et al. |
| 5,602,761 A | 2/1997 | Spoerre et al. |
| 5,629,872 A * | 5/1997 | Gross et al. ................. 702/116 |
| 5,668,741 A * | 9/1997 | Prigent ....................... 702/182 |
| 5,684,718 A * | 11/1997 | Jenkins et al. ................ 702/57 |
| 6,199,019 B1 | 3/2001 | Iino et al. |
| 2002/0179050 A1 | 12/2002 | Soliman et al. |

* cited by examiner

*FIG. 4* ent of the parts may make
mounting and monitoring load sensors difficult or cumbersome, particularly for rotating parts, which would require
data transmission paths between a moving sensor and a fixed
receiver. Adding load sensors to all of the parts to be monitored increases the complexity of the equipment and requires
additional electronics, which increase weight and cost.

There is a desire for an efficient, reliable, affordable, and
robust way to conduct load monitoring. There is also a desire
for a system that generates load estimates that are accurate
enough to use as a basis for part design and monitoring based
on the load estimates.

SUMMARY OF THE INVENTION

The present invention is directed to a method and system
for estimating a desired time-varying signal, such as a signal
reflecting a load applied to a part, based on measured state
parameters rather than direct signal measurement. The invention includes model training and actual signal estimation
based on the trained model. During model training, a signal
model is obtained by empirically obtaining measured output
signals corresponding to measured state parameter inputs.
Features, such as mode shapes and amplitudes, are extracted
from the measured output signals. Time-invariant features,
such as mode shapes, are stored in an estimation model along
with a map that links measured state parameters with time-varying features, such as mode amplitudes. The estimation
model therefore provides model parameters and infrastructure linking measured state parameters with their corresponding signal features.

During the actual signal estimation process during part
operation, state parameters measured during part operation
are entered into the estimation model. Estimated features are
obtained from the measured state parameters via the estimation model. The estimated features from the estimation model
are used to reconstruct an estimated signal (e.g., a load signal
estimate). In the load example, the estimated signal is a waveform reflecting the actual load (e.g., force) applied to the part
or the response of the part to the load (e.g., stress) based on the
measured state parameters. Because the state parameters may
be easier or more efficient to obtain, the estimation model can
predict entire signal waveforms without direct monitoring of
the signal itself.

These and other features of the present invention can be
best understood from the following specification and drawings, the following of which is a brief description.

DETAILED DESCRIPTION OF THE PREFERRED EMBODIMENT

Figure 1:
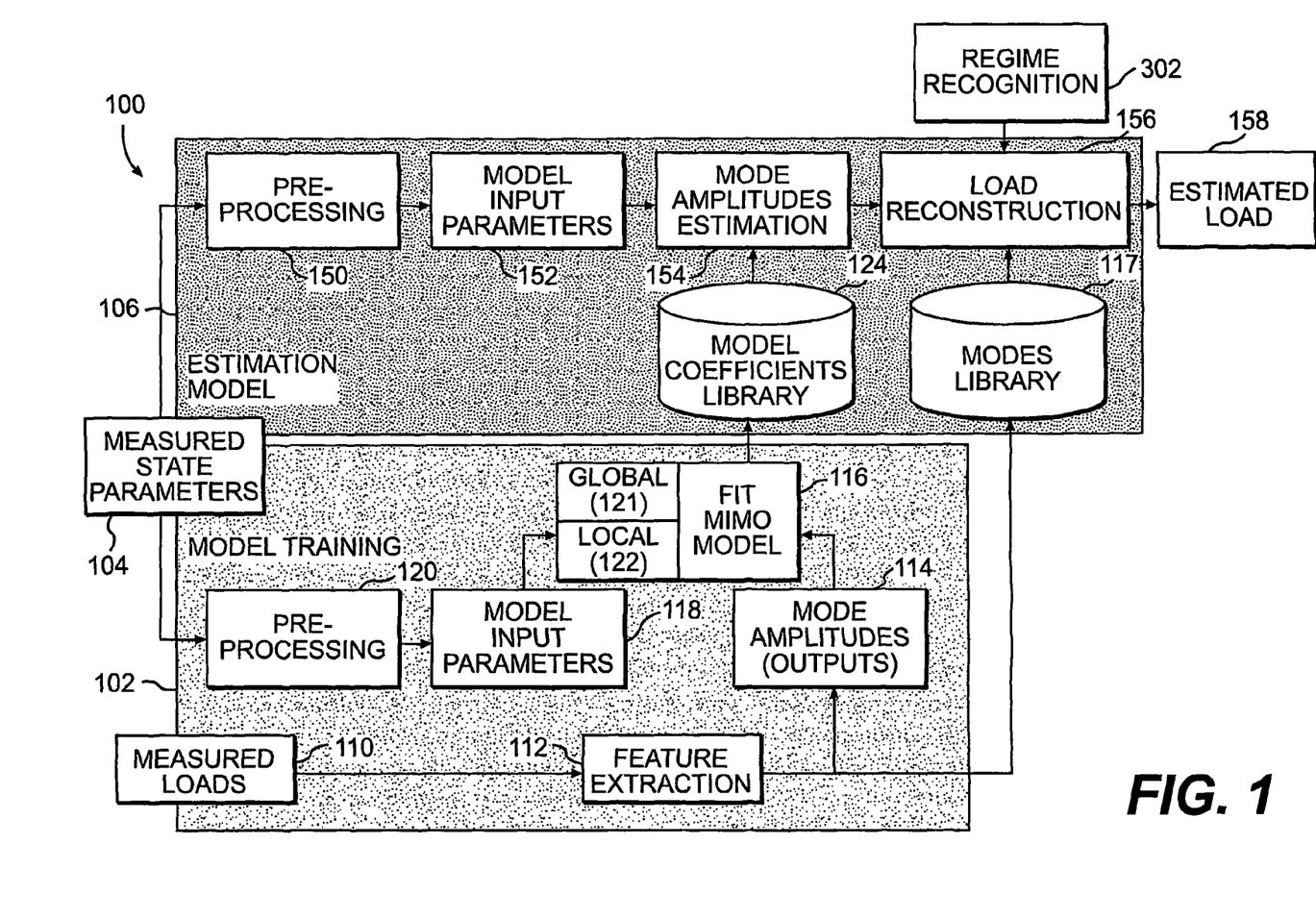
FIG. 1 is a block diagram of a signal estimation process
according to one embodiment of the invention.

FIG. 1 illustrates one embodiment of an overall signal
estimation process 100 according to one embodiment of the
invention. Although the description below focuses on load

VIRTUAL LOAD MONITORING SYSTEM AND METHOD

REFERENCE TO RELATED APPLICATIONS

This application is a 371 of PCT Application No. PCT/US2004/025733 filed on Aug. 9, 2004, which claims priority
to U.S. Provisional Application No. 60/493,198, which was
filed on Aug. 7, 2003.

TECHNICAL FIELD

The present invention relates to a system and method of
monitoring operation of a part experiencing at least one load

BACKGROUND OF THE INVENTION

Many systems experience characteristics having quasi-periodic properties. For example, equipment containing load-bearing parts (e.g., rotorcraft, jet engines, HVAC chillers,
electric motors, etc.) are used in many applications. Designers usually use conservative assumptions regarding the loads
that the parts will encounter in service. In actual use, however,
the parts in the equipment may encounter loads that are
greater than anticipated, causing the life of the part to require
service or replacement earlier than planned or part failure.
Similarly, the part may encounter loads that are smaller than
anticipated, causing unnecessary service scheduling when
the part is still in good condition.

When designing each part, designers tend to be conservative and over-design parts having properties (e.g., strength,
mass, shape, etc.) needed to withstand worst-case expected
load levels. More particularly, individual parts may be
designed assuming a maximum load level associated with
each type of operating state and assuming a certain percentage of time spent in each state. The parts are then designed
based on the anticipated maximum loads encountered during
each state and the number of instances that each state is
anticipated to occur. These estimates are usually conservative
to ensure optimal operation for an extended time period, even
under conditions that are more severe than normal.

The parts are also designed to withstand a maximum worst-case composite usage profile that reflects conditions that are
harsher than normal. For example, the parts may be designed
to withstand forces encountered by the most severely-used
equipment. If the actual equipment operation is similar to the
assumptions used during design of the equipment parts, the
parts should last for the expected lifespan. As a practical
matter, however, some equipment may be used in conditions
that are more severe than assumed. For example, a rotorcraft
used in combat will contain parts that will require replacement earlier than the expected lifespan, while a rotorcraft
used in less demanding conditions will not and may even last
longer than the expected lifespan.

It is not always possible to design parts that are strong
enough to last indefinitely under all operating conditions
because they would be too large, expensive and heavy to be
practical. Because equipment parts are often expensive to
replace, it is desirable to monitor the load on the part to
determine whether a given part actually requires replacement.
For example, if a part is designed with an expected lifespan of
10,000 hours, a part that has been used for 10,000 hours in
mild conditions would probably not require replacement until
much later, while a part used in combat may require replacement at the 10,000 hour mark.

Because of these varying operational conditions, it would
be desirable to monitor the actual loads on a part during estimations, it is to be understood that the system and process can be used in any application where accurate signal estimates are desired.

1. Overview of Signal Estimation Concept

Data corresponding to loads applied on a part or a part response to a load (collectively referred to as "loads" in this application) provides valuable information on how a component is being used. In many cases, however, it is difficult to obtain accurate load measurements of the part, particularly if the part is rotating or otherwise moving. Although there have been proposed methods for estimating loads generally, they have exhibited various problems.

Estimation techniques may be categorized according to their estimation capabilities and complexity, such as whether the estimation technique is linear or non-linear, static (i.e., memory-less) or dynamic (i.e., state space), physics-based or empirical, etc. For load estimation, non-linear techniques are commonly used in view of the non-linear characteristics of loads in general. Neural networks are widely known as general non-linear function approximators and have been suggested for load estimation. However, neural networks act as a "black box"; that is, neural networks generate outputs that meet specified functional requirements without providing any insights or practically-useful information regarding the actual process used to generate the outputs. Also, a common problem with neural networks is that it is difficult to assess the reliability of the output estimate from the network. This inherent unreliability makes neural networks impractical for applications where high accuracy is desired. Also, the large amount of data that needs to be processed to estimate a full time history of a load signal makes it difficult to train a neural network for load estimation.

The invention overcomes the shortcomings of currently known non-linear estimators by exploiting the structure of the signal to be estimated. Generally, the invention is a mathematical construct that acts as a virtual sensor to infer a measurement of a desired signal, such as a load, from easily available state parameters (e.g., pilot controls, aircraft weight, aircraft attitudes, etc.). The key to virtual sensing is creating a map between the desired signal output and the state parameter inputs.

Rather than relying on a neural network to conduct the mapping, the invention identifies fundamental features, such as mode shapes and mode amplitudes, in the desired measurement and then maps the mode amplitudes and the mode shapes with the state parameters. The invention therefore acts as a virtual sensor that can estimate a desired signal from measured state parameters.

More particularly, with respect to estimation of dynamic signals for a rotating part, the invention takes advantage of the quasi-periodic (i.e., repetitious) properties of the signals corresponding to a rotating part. The dynamic signal on a rotating part will naturally have quasi-periodic properties as a result of the repetitive nature of the part's movement, due to frequency perturbations caused by variations in the rotational speed and also due to variations in operating conditions. These quasi-periodic properties may have unique behaviors, depending on the specific instantaneous use of the part. Fixed parts will also have their own inherent quasi-periodic properties reflecting the influence of rotation or other repetitious behavior on the parts. By capturing non-linear behavior in the repetitive quasi-periodic properties, whose amplitude may be estimated by standard linear techniques, the invention simplifies the signal estimation while providing more control over the accuracy of the signal estimation.

As noted above, it is often not practical to measure loads or response for a desired part directly, particularly for rotating parts. In many cases, attaching a sensor to a rotating part would be difficult, expensive, or unreliable. Thus, it may be more desirable to develop a model for estimating dynamic signals. To estimate loads, the invention infers signal information for a given part by inputting measured state parameters into a signal estimation model. In other words, the invention estimates load values from state parameters. The estimation model itself is developed by developing a map of the relationships between state parameters and known signal information. Note that previously known methods are only able to estimate small portions of the signal information (e.g., the peak-to-peak amplitude at a dominant frequency) and in most cases did not estimate the signal waveform itself. Currently known signal waveform estimation methods rely on spectral methods that do not recognize any specific relationships between mode shapes and measured signals. By estimating signal waveforms from known state parameters, the model can generate needed signal information from parameters that are easier, more reliable, or more inexpensively obtained than direct signal measurements.

2. Details of Signal Estimation Model Example for Load Monitoring

Referring to FIG. 1, the signal estimation process 100 includes two parts. The first part is model training 102, where the model of the desired estimated output signal (e.g., a model for estimating loads) is obtained through empirical waveforms containing "features" from measured loads and state parameters 104 obtained during empirical testing. During model training, the state parameters 104 and the measured loads come from the same part operation. In the case of aircraft, for example, the state parameters 104 may include pilot inputs, engine torque, aircraft attitude, rate of climb, vibration, etc.

As used in this description, the term "signal" describes any time-variant variable to be estimated. As is known in the art, signals can be directly measurable or obtained from more accessible signals using transfer functions. The term "feature" refers to an element of a feature space that includes characteristics describing the signal of interest. For example, in the examples described below, features include mode shapes and mode amplitudes as independent features; that is, the feature is any characteristic of the signal of interest. The feature space is ideally broad enough to describe various sampled signals corresponding to the same part under different operating conditions. Moreover, as used in this specification, the term "load" encompasses the loads themselves (e.g., mechanical loads, electromechanical loads, electromagnetic loads, etc.) as well as responses (e.g., electromechanical responses, electromagnetic responses, optical responses, etc.) to a load; thus, load signals may indicate, for example, force, moment, torque, stress, strain, current, and/or voltage.

An estimation model 106 is obtained by mapping relationships between the features in measured loads 110 and the state parameters 104. The estimation model 106 thus acts as a virtual sensor that can infer features in a load signal, and therefore the load itself, from measured state parameters 104 through these features.

The second part is application of the estimation model 106 to new measured state parameters. During equipment operation, measured state parameters 104 are input into the estimation model 106. The state parameters 104 generally are measurable operational parameters of a physical system that describe the temporal behavior or other attributes of the system as a whole rather than providing detailed information about the part itself. The state parameters 104 may also describe an environment in which the system operates. The state parameters 104 are then used to obtain estimated features defining an estimated load signal. The estimation model 106 can then use the estimated features to synthesize a load signal waveform that is an estimate of the actual loads and/or actual responses experienced by the part. More particularly, the estimation model 106 infers a correlation between the state parameters 104 and the load signal.

In one example, the features reflect the load signal over time with respect to various operating conditions. More particularly, the estimation model 106 separates time dependent features, such as mode amplitudes, and time-invariant features, such as mode shapes, and then stores the time-invariant features in a library. Note that the time-invariant features in this example are functions of an azimuth angle defined, for example, over a span of a single revolution of a rotating part. The mode shape reflects many characteristic details of the signal behavior over one revolution, while the mode amplitude reflect signal characteristics that change more slowly over multiple revolutions.

By separating the load estimation process 100 into two separate steps, the invention is able to capture most of the key non-linearities in the relationships between the measured state parameters and the load. The two-step process also builds in more information about the relationships between loads and the state parameters 104 by predicting an entire load signal waveform output rather than a single characteristic of the waveform (e.g., peak-to-peak amplitude) as in most previously known methods.

Referring to FIG. 1 in greater detail, the model training process 102 according to one example may include obtaining measured loads 110 by instrumenting a part of interest in test machinery, rotating the part, and obtaining output signals from one or more load sensors. The sensors are ideally located in load-bearing paths and physically located as close to the part (or a critical location on the part) as possible.

A feature extraction step 112 extracts the features from the sensor outputs. The features themselves may be, for example, mode shapes and mode amplitudes of the output signal from the sensor. Mode shapes correspond to combinations of harmonics or other inherent behavior that is always present in a given load signal, while mode amplitudes act as coefficients for the mode shapes and indicate the influence of each of the mode shapes on the final output signal waveform.

The goal of the feature extraction step 112 is to determine the nature and the number of features that will allow accurate load estimation and to eventually obtain a compact representation of the load through time scale separation, feature extraction and mode truncation. The feature extraction step 112 generally involves conducting shaft-synchronous discretization of the load sensor outputs, transforming the load sensor outputs into a two-dimensional array ("matrix A") parameterized by, for example, azimuth angle (vertically) and revolution number (horizontally). In one example, features are obtained by singular value decomposition of matrix A, where left-handed singular vectors define mode shapes and the product of singular values and right-handed singular vectors define mode amplitudes. Note that this is equivalent to computing eigenvectors and eigenvalues of a covariance matrix $AA^T$, where $A^T$ is the transposition of A. In this case, normalized eigenvectors play a role in the mode shapes, and the projection of A onto each eigenvector becomes the corresponding mode amplitude. Eigenvalues represent energy level contained in each mode. Using singular vectors or equivalent eigenvectors of the covariance matrix described above as mode shapes allows minimization of the number of features needed to estimate load sensor outputs accurately.

Figure 2:
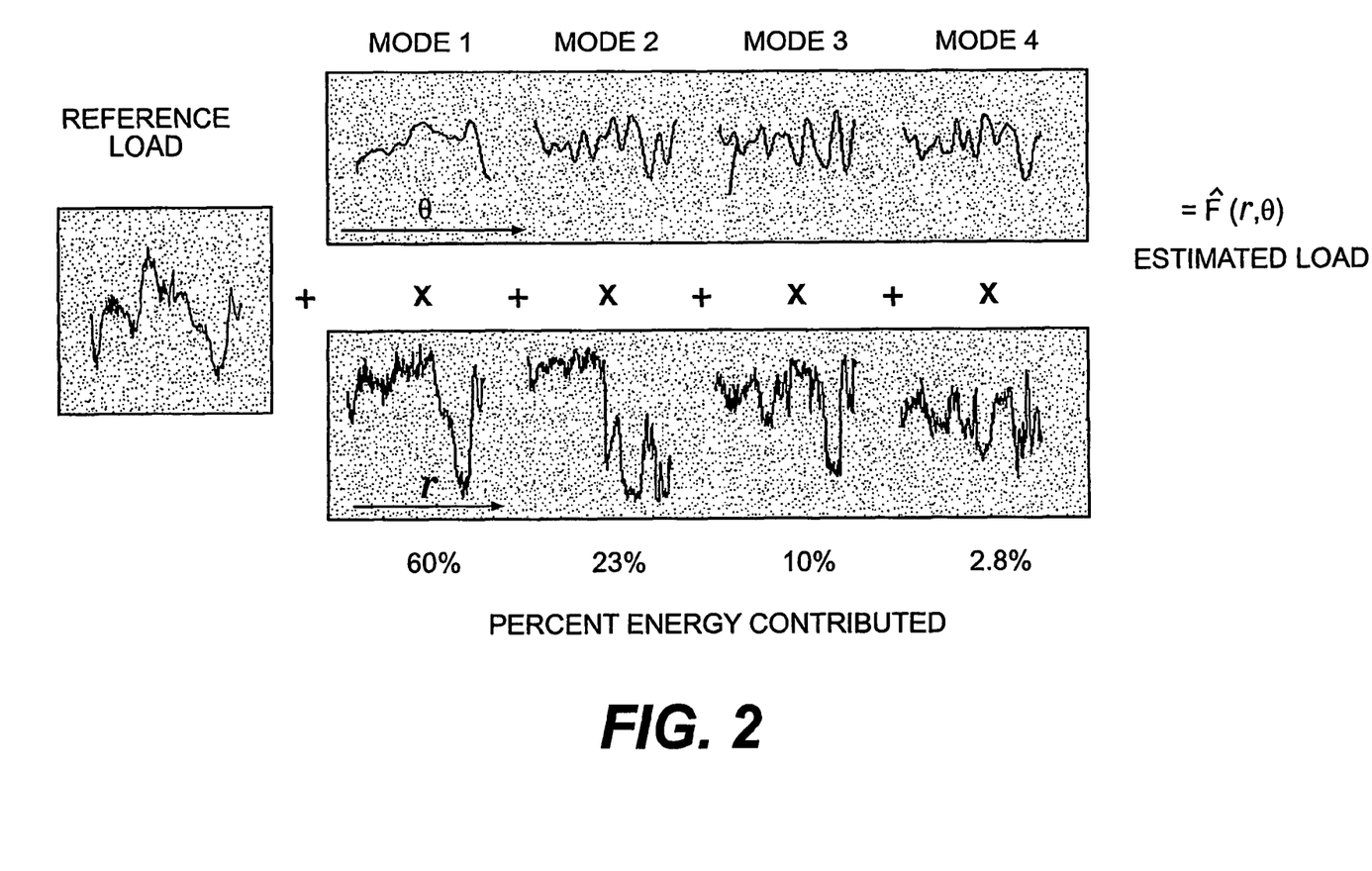
FIG. 2 illustrates an example of features in a signal.

FIG. 2 illustrates one example of the relationship between the output signal of the load sensor and its features. This relationship is used to both extract the features from the load sensor as well as to reconstruct estimated signals from features derived from measured state parameters 104. In one embodiment, the relationship between the state parameters 104 and the mode amplitudes is in the form of a linear map, such as a multiple linear regression model, but other relationships (e.g., general linear models, neural network models, state space models, etc.) are possible. The relationship may be shaped or otherwise modified through, for example, specific selection, filtering, smoothing and/or weighting of the inputs and outputs.

In this example, each time-invariant feature represents one full revolution of the shaft and is derived from analyzing the measured load signal 110. More particularly, each time-invariant feature is a specific waveform corresponding to a sequence of loads that a given part experiences during one shaft revolution. For example, in the case of rotating blades in a rotorcraft, the blades will experience different loads when they sweep into an oncoming airstream as opposed to when they sweep away from the same airstream. Thus, there will be a definite pattern reflected in the load signal over one rotation/cycle. In other words, the load signal is analyzed over a discrete time segment comprising one revolution of the shaft. Note that it is also possible to extract features over another fixed interval in the azimuth angle domain rather than a full revolution.

As noted above, the measured load 110 signal is represented through mode shapes and mode amplitudes. The mode shapes, are in the azimuth angle domain $\Theta$, while the mode amplitudes 114, which correspond to the strength of each mode shape, are in the revolution domain r. Represented mathematically, a given load signal $F(r,\Theta)$ may be approximated by another signal $\hat{F}(r,\theta)$ (load estimate) having the following form:

$$\hat{F}(r,\theta)=C_0(r)+C_1(r)\Phi_1(\theta)+C_2(r)\Phi_2(\theta)+\ldots+C_M(r)\Phi_M(\theta)$$

where $\Phi(\Theta)$ is the mode shape, $C(r)$ is the mode amplitude, and M is the number of modes that are being used in the estimation model. Note that the first term in the sum does not include mode shape; this is because this mode shape is assumed to be a constant function of $\Theta$.

As shown in FIG. 2, the load signal $F(r,\Theta)$ is simply the sum of a reference load $\Phi_0(\Theta)$ and terms containing the product of mode shapes and their associated mode amplitudes. Each mode shape has a corresponding energy level represented by the integral of mode amplitudes 114, whose values are driven by the state parameters 104. The energy level for a particular mode shape, expressed as a percentage of the total energy equal to the sum of energies of individual modes, is a convenient aggregate measure of the mode's importance and influence in the estimated signal. Mode shapes act as functions in a given signal, while the mode amplitudes 114 act as coefficients for the mode shapes and reflect the unique shape of the signal. Because the mode amplitudes 114 are driven by the state parameters 104, it is possible to both distill unique mode amplitudes 114 from a measured load associated with a given set of state parameters 104 and to estimate mode amplitudes 114 corresponding to a set of state parameter 104 inputs.

Referring back to FIG. 1, the mode shapes are sent to a modes library 117. As noted above, the mode shapes are fixed functions for a given part regardless of the state parameters 104; that is, the mode shapes reflect an inherent, fundamental frequency content of the part being analyzed. The mode amplitudes 114, however, change as the state parameters 104 change, making it possible to deduce mode amplitudes 114 based the state parameters 104. The mode amplitudes 114 are outputs of a multiple-input/multiple-output (MIMO) model 116 for which measured state parameters (after being pre-processed) serve as inputs. The MIMO model 116 receives model input parameters 118 that are derived from the measured state parameters 104. The mode amplitudes 114 and the model input parameters 118 obtained from known measured state parameters 104 are collectively called "training data" because they train the MIMO model 116 to output a given set of mode amplitudes 114 in response to measured model input parameters 118.

In one example, during the preprocessing step 120, the measured state parameters 104 are transformed from the time domain into the revolution domain to obtain model input parameters 118 that are in the same domain as the mode amplitude 114. In one example, the state parameters 104 are pre-processed (e.g., scaled, low-pass or band-pass filtered, interpolated, etc.) to create new state parameters 104 for the model. The processing step 120 may include linear and non-linear transformations, computation of interaction parameters, etc.). The result is a set of parameters, or predictors, that are in matrix form parameterized by revolution number and that can be used as model inputs during signal estimation. Each column of the matrix in this example corresponds to the time history of one input parameter.

The model input parameters 118 and the mode amplitudes 114 are then fitted into the MIMO model 116 to define relationships between the state parameters 104 and the mode amplitudes 114, which in turn are related to the load on the part. The MIMO model 116 ties the state parameters 104 and the mode amplitudes 114 through any desired appropriate relationship (e.g., linear or non-linear, static or dynamic).

Note that the MIMO model 116 does not need to be a single model or have a single specific form. For example, the estimation model may include a global model 121 and one or more local models 122. The global model 121 is simply a model that is a single representation of the relationship between state parameter inputs and the load signal outputs. That is, the global model 121 acts as a single feature space that is used for signal estimation in all or many operating conditions. Although the global model 121 can provide useful overall information about the load, it may be desirable to also create more precise models that reflect the load under specific operating conditions.

To do this, the training data (i.e., the model input parameters 118 and the mode amplitudes 114) may be partitioned so that separate local models 122 may be developed for each partition. These local models 122 in essence act as individual feature spaces, each space representing a different operating condition of the part or a group of closely-related conditions. Increased accuracy can be obtained through appropriate partitioning to allow different local models 122 to be used in different situations. For example, in a rotorcraft application, the data may be partitioned according to flight regime (i.e., a given flight maneuver) because different regimes will generate different patterns of dynamic loads on the part and thereby generate different mode amplitudes warranting different estimated loads. The training data may also be partitioned based on aircraft configuration.

Figure 3:
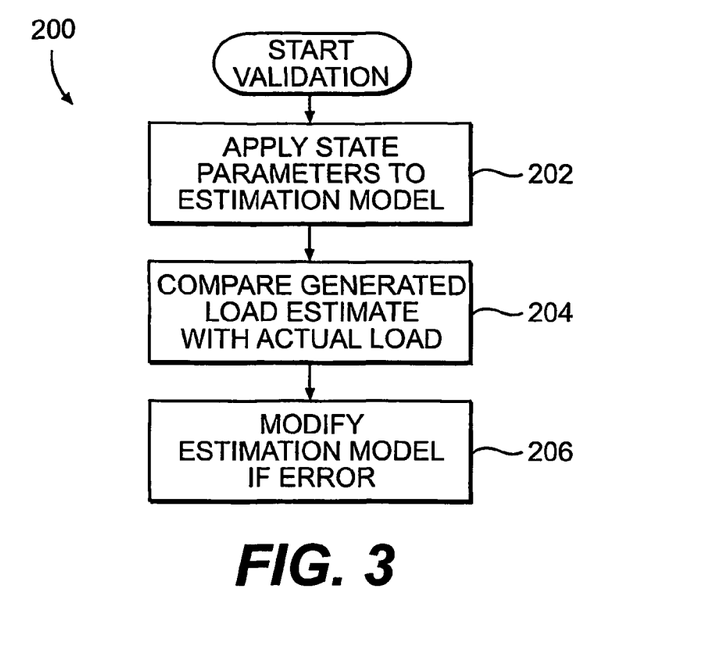
FIG. 3 is a block diagram illustrating a model validation
process according to one embodiment of the invention.

Note that different local models 122 for the same part may vary in both their mode shapes and model coefficients or only in their model coefficients. A regime recognition step 302 may be used to determine when individual local models should be used. Regime recognition may also be incorporated as a separate modeling layer in the estimation model 102 so that it will use the same state parameters 104 to determine which local model to use. Although it is possible to use the global model 121 or the local models 122 alone, using both provides higher quality information and also allows detection of anomalous conditions, particularly when the estimated load generated by one model does not match the estimated load generated by the other model.

A model coefficient library 124 is then generated from the MIMO model 116. The model coefficient library 124 acts as a map that defines the relationships between the input parameters and the mode amplitudes 114. In one example, the model coefficient library 124 contains coefficients of a linear regression model. The model coefficient library 124 and the modes library 117 together act as the estimation model 106 used to infer loads from measured state parameters 104 that are input into the model 106.

To ensure that the estimation model is robust for a broad range of equipment configurations and operating conditions, load measurements and state parameter measurements are conducted for a set of selected representative equipment configurations and operation conditions. Model training is ideally performed using statistically representative data.

Once the estimation model 106 has been trained by the model training step 102, the estimation model 106 can generate estimated loads from new measured state parameters 104 by inferring output signal waveforms (e.g., load signal waveforms) from the state parameters 104. The final results of model training include the modes library 117 containing mode shapes, the coefficients library 124 containing coefficients of the model, an algorithm that realizes the MMO model 116 using the coefficient library 124, a pre-processing algorithm to process raw state parameters 104 to form the model input parameters 118, and an algorithm that synthesizes an estimated signal output waveform from the mode shapes and the estimated mode amplitudes.

Application of the estimation model 106 to generate an estimated signal output starts by pre-processing the measured state parameters 104 in a pre-processing step 150 in the manner noted above to obtain model input parameters 152. The model input parameters 152 are then sent to a mode amplitudes estimation step 154. In this step, the model input parameters 152 are mapped to estimated model amplitudes by applying the MIMO model 116 algorithm with model coefficients library 124 to obtain estimated mode amplitudes.

The estimated mode amplitudes are then sent to a load reconstruction step 156 where they are combined with mode shapes from the modes library 117 to synthesize the estimated load waveform 158. Note that there may be cases where the estimation model 106 needs to take into account measured state parameters 104 that fall outside of the range of the training data used to generate the estimation model 106. In this case, it is possible to obtain the mode amplitudes corresponding to the out-of-range state parameters 104 in the same way as described above, particularly if MIMO model 116 is a linear map. Moreover, any available direct load measurements of loads, even on a temporary basis, may be used as feedback to the model 106 to update and customize the model 106 based on actual operation of the particular craft, further improving the fidelity of the models 106.

By constructing estimated load signals from measured state parameters, the invention is able to conduct virtual load sensing without actually using physical load sensors on the parts of interest. The invention therefore replaces direct load sensing with virtual load sensing using measurements that are easier and more efficient to obtain.

Once the estimated load waveform 158 has been obtained, the estimated load 158 may undergo a validation process 200 as shown in FIG. 3 to test the accuracy of the estimation and the robustness of the estimation model 106 in general. Note that the model validation process 200 is an analytical validation and is normally not conducted during actual equipment operation. Instead, it is usually conducted as the estimation model 106 is being developed.

During validation, it is assumed that the measured load 110 is available for comparison. To test the validity of the estimation model 106, the state parameters 104 corresponding with the measured load 110 are applied to the estimation model 106 in the manner described above (block 202). Once the estimated load 158 corresponding with the measured state parameters 104 is obtained, the estimated load is compared with the actual measured load (block 204). The key to the validation process 200 is to test the estimation model 106 with data that was not used during model training 102.

Any errors between the estimated load 158 and the actual measured load 110 are accounted for. The errors themselves reflect inaccuracies in the estimation model 106 and may be evaluated individually (e.g. using scatter plots) or statistically (e.g. by computing root-mean-square for the error). The estimation model 106 may be modified (block 206) in view of these errors via any desired manner, such as by increasing the number of features in the model or improving the selection of data to be used as training data (e.g., by using statistical sampling techniques known as boosting). The validation process 200 confirms whether the estimation model 106 developed so far can be generalized for different aircraft, different flight regimes, and other differences that would change the state parameters 104. Note that the validation process 200 may be conducted during actual equipment operation, if desired and if actual load measurements are available.

A given estimation model may reflect the outputs of multiple sensors instead of a single sensor and derive features that reflect the output signals of the multiple sensors. This results in a composite estimated signal corresponding to the operation of multiple sensors. In this case, each sensor will have its own associated sensor-specific model with its own independent mode shapes and mode amplitudes (i.e., their own independent features). More particularly, the features associated with each sensor act as the sensor-specific model to reflect the operation of that sensor. The sensor-specific mode shapes associated with each sensor are then combined to form composite mode shapes that describe the entire set of loads experienced by the multiple sensors simultaneously.

The composite mode shapes can be chosen such that to allow the load signals of multiple sensors to be described by only one set of mode amplitudes rather than multiple sets of independent mode amplitudes corresponding to each sensor. This creates a more robust model by capturing relationships among the virtual sensors, which would not be possible if each model corresponded to only a single sensor. This also allows the model mapping input parameters into mode amplitudes to be more compact and efficient than if estimating the output each load sensor individually. Combining sensor-specific models of multiple sensors in a single estimation model also allows monitoring of time-dependencies within the estimation model.

In one example, node shapes for multiple load sensors allowing the have a unique set of mode amplitudes as described above was obtained by stacking matrices in the model corresponding to individual loads together vertically (i.e., along the azimuth angle dimension) to form a composite matrix. In one example, mode shapes and mode amplitudes are obtained from this matrix using singular value decomposition as described above for the case of single sensor. Note that mode shapes obtained here are extended mode shapes that can be broken into individual mode shapes for each sensor. MIMO model 116 is then fit using input parameters derived from state parameters as inputs and computed mode coefficients as outputs.

The estimation process is then conducted in the manner described above from the measured state parameters 104, applying the inputs derived from the state parameters into the connected multi-sensor model. As described above, the mode shape obtained in model training is split into separate mode shape groups, each mode shape group corresponding to one of the discrete loads. Note that the number of mode amplitudes in this case does not increase because each load is a result of the same state parameters, resulting in the same mode amplitudes; only the mode shapes for each load are different.

This invention also extends the multiple-sensor estimation model architecture described above into a new architecture to integrate virtual sensors and direct measurement load sensors to provide an enhanced multi-functional sensor suite. This type of sensor system is unique because it provides an adaptive, self checking architecture suitable for diagnostics and prognostic health management. In one example, direct measurement sensors also act as virtual sensors within the multiple-sensor model architecture described above. This allows measurements to be compared continuously or on an as-needed bases to check the entire multiple sensor suite and provide discrete or dynamic estimation model adaptation.

Figure 4:
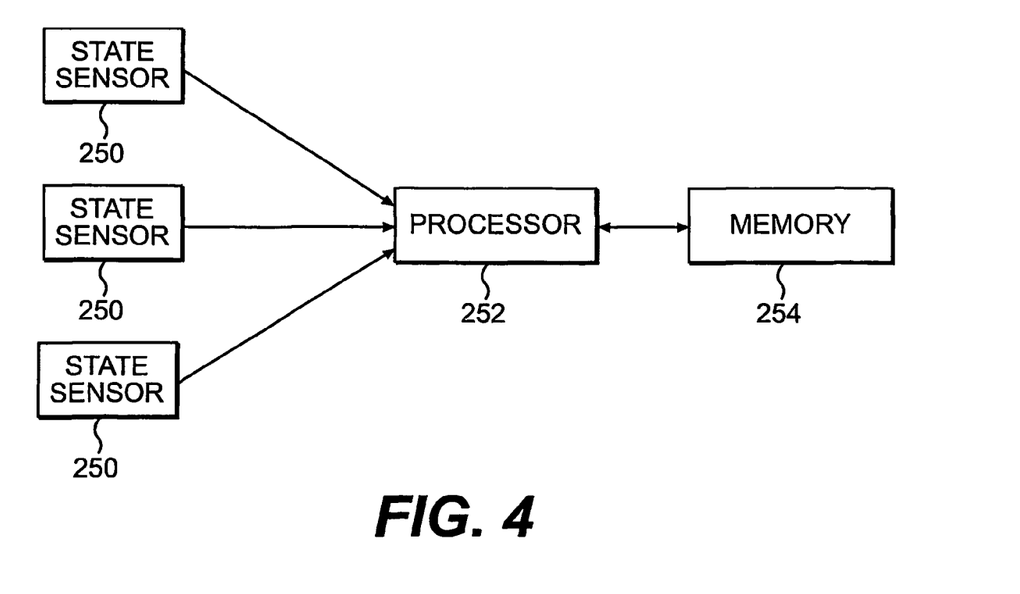
FIG. 4 is a representative diagram of a system that conducts
the signal estimation process according to one embodiment of
the invention.

The load estimation process 100 described above can be conducted in any appropriate system hardware and software without departing from the scope of the invention. As shown in FIG. 4, input state parameters may be measured through any desired sensors 250 as well as other input sources and sent to a processor 252. The processor 252 conducts the pre-processing step 150, the mode amplitudes estimation step 154, and the load reconstruction step 158 by retrieving mode coefficients and mode shapes from their respective libraries 117, 124, which are stored in one or more memory devices 254.

The physical locations of the various estimation system components is not critical to the operation of the system. Any or all of the components may be, for example, off-board (e.g., on the ground), on-board (e.g., on an aircraft), or any combination of the two.

Note that even though the examples above assume that a part is actually operating while the load signals are being obtained to generate the model, the model can be obtained through a simulated part operation as well without departing from the scope of the invention.

3. Potential Load Monitoring Applications

Although the above examples focus on virtual sensing and monitoring of loads containing harmonic content with respect to rotorcraft, those of skill in the art will recognize that the method and system described above may be used in any application that experiences quasi-periodic characteristics, such as jet engines, HVAC chillers, electric motors, optical applications, etc., without departing from the scope of the invention. Also, the inventive estimation process may be used to estimate signals in fixed, non-rotating parts as well (i.e., signals having mode shapes with either simple frequency content or no frequency content).

Moreover, the information obtained through the load monitoring system and method described above is accurate and detailed enough to be used for conducting various fleet management and design functions. Possible applications include, for example, calculations of remaining lifespan in the part based on the estimated loads, life-extending control that informs a user when he or she is entering a regime that is potentially damaging to the equipment so that the user can either back off or allow the flight control system to change operation to minimize the damaging conditions. In aircraft applications, for example, the load monitoring may also be used for condition-based fleet management, in which equipment maintenance is based on the load monitoring and actual usage information rather than simply flight hours or cycles of usage. This allows customization of maintenance to the actual conditions encountered by the equipment, reducing overall maintenance time and costs. Over time, the equipment structural design may be optimized according to the anticipated loads they may encounter, thereby allowing loads to be less conservative and avoid unneeded over-design of parts. The load monitoring also provides the ability to estimate loads easily during equipment operation.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A method of generating a signal estimation model comprising:
   obtaining an actual signal during operation of a system;
   obtaining at least one state parameter during the same operation conducted for the step of obtaining of the actual signal;
   extracting at least one fixed feature and at least one variable feature from the actual signal;
   constructing a variable feature estimation model that maps said at least one variable feature by said at least one state parameter in the feature estimation model; and
   constructing a synthesis model that synthesizes an estimated signal from the at least one variable feature obtained using the feature estimation model and at least one fixed feature.

2. The method of claim 1, wherein said at least one variable feature comprises at least one mode amplitude, and wherein said at least one fixed feature comprises at least one mode shape.

3. The method of claim 2, wherein said at least one mode amplitude comprises a plurality of mode amplitudes and said at least one mode shape comprises a plurality of mode shapes, and wherein said plurality of mode shapes are a plurality of functions, and wherein said plurality of mode amplitudes are coefficients for said plurality of mode shapes.

4. The method of claim 1, wherein the at least one state parameter is one of a plurality of state parameters and wherein the at least one feature is one of a plurality of features, wherein the signal estimation model comprises a plurality of local signal estimation models generated by partitioning said plurality of state parameters and said plurality of features according to regimes and generating each of said local signal estimation models within each partition.

5. The method of claim 4, wherein each local model corresponds to a regime having a selected range of values of state parameters.

6. The method of claim 1, further comprising validating the signal estimation model by:
   generating an estimated signal using known state parameters; and
   comparing the estimated signal with a signal measured during operation of the part with state parameters matching the known state parameters.

7. The method of claim 1, wherein the signal estimation model is generated by:
   obtaining a plurality of sensor-specific signals from a plurality of load sensors; and
   combining the plurality of sensor-specific signals to obtain a composite signal estimation model.

8. The method of claim 1, wherein the extracting step comprises obtaining a N-dimensional away from the actual signal and constructing said at least one variable feature and said at least one fixed feature from the array, wherein $N \geq 2$.

9. The method of claim 1, wherein the estimated signal is at least one selected from the group consisting of an actual load and a response to a load.

10. A signal estimation method for estimating a time-varying signal carrying information about a load on a part or a response to the load on the part, comprising:
    obtaining at least one input state parameter;
    using an estimation model to:
        obtain at least one mode amplitude based upon a map of a relationship between said at least one input state parameter and said at least one mode amplitude; and
        obtain a signal portion from said at least one mode amplitude and at least one respective mode shape; and
    constructing the estimated signal using said signal portion.

11. The method of claim 10, wherein the estimated signal from the constructing step acts as a virtual sensor output.

12. The method of claim 11, wherein the method further comprises combining the virtual sensor output with at least one physical sensor output.

13. The method of claim 10, wherein the estimated signal is at least one selected from the group consisting of an actual load and said response to said load.

14. The method of claim 10, wherein said at least one mode amplitude is a plurality of mode amplitudes and said at least one mode shape is a plurality of mode shapes, and wherein the constructing step comprises synthesizing said plurality of mode amplitudes with said plurality of mode shapes to obtain the estimated signal.

15. The method of claim 10, wherein the estimation model is generated by:
    obtaining a plurality of sensor-specific signals from a plurality of sensors; and
    combining the plurality of signals to obtain a composite estimation model.

16. The method of claim 10, wherein said signal portion is one of a plurality of signal portions, and wherein the estimation model corresponds to a plurality of estimated signals, and wherein the method further comprises:
    separating the plurality of signal portions into groups, each group corresponding to one of said plurality of estimated signals; and
    conducting the constructing step on each group.

17. A signal estimation method, comprising:
    obtaining at least one input state parameter;
    obtaining at least one estimated variable feature from said at least one input state parameter via a feature estimation model, wherein the feature estimation model maps relationships between the at least one state parameter and at least one variable feature; and
    constructing an estimated signal from said at least one estimated variable feature and at least one fixed feature.

18. The method of claim 17, wherein the signal estimation model comprises a plurality of local signal estimation models generated by partitioning a plurality of input state parameters and said plurality of estimated variable features and generating each of said local models within each partition.

19. The method of claim 18, wherein each local model corresponds to a regime having a selected range of values of state parameters.

20. The method of claim 19, wherein the regime is at least one of a system operating regime and a system configuration.

21. The method of claim 17, wherein said at least one estimated variable feature comprises at least one mode amplitude, and wherein said at least one fixed feature comprises at least one mode shape.

22. The method of claim 21, wherein said at least one mode amplitude is a plurality of mode amplitudes and said at least one mode shape is a plurality of mode shapes, and wherein the constructing step comprises synthesizing said plurality of mode amplitudes with said plurality of mode shapes to obtain the estimated signal.

23. The method of claim 17, wherein said at least one input state parameter corresponds to at least one system operating state.

24. The method of claim 17, wherein the estimated signal from the constructing step acts as a virtual sensor output, and wherein the method further comprises combining the virtual sensor output with at least one physical sensor output.

25. The method of claim 17, wherein the signal estimation model corresponds to a plurality of estimated signals, and wherein the method further comprises:
separating the plurality of fixed features into groups, each group corresponding to one of said plurality of estimated signals; and conducting the constructing step on each group using the same estimated variable features for each group and the fixed features corresponding to a given group.

26. The method of claim 17, wherein the estimated signal is at least one selected from the group consisting of an actual load and a response to a load.

27. A load signal estimation system for estimating at least one of a load on a part and a response to a load, comprising:
a memory that stores a model coefficients library and a mode shape library, wherein the model coefficients library is part of an estimation model that maps a relationship between at least one input state parameter and at least one mode amplitude; and
a processor that receives said at least one input state parameter, obtains said at least one mode amplitude corresponding to said at least one input state parameter, and constructs an estimated load signal from said at least one mode amplitude and at least one mode shape taken from the mode shape library.

28. The load signal estimation system of claim 27, wherein the processor acts as a virtual sensor such that the estimated load signal acts as a virtual sensor output.

29. The load signal estimation system of claim 28, wherein the processor combines the virtual sensor output with at least one physical sensor output.

30. The load signal estimation system of claim 27, wherein the estimation model is a composite estimation model constructed from a plurality of sensor-specific load signals output by a plurality of load sensors.

* * * * *